(12) United States Patent
Simoens et al.

(10) Patent No.: US 11,870,542 B2
(45) Date of Patent: Jan. 9, 2024

(54) SATELLITE COMMUNICATION TRANSMITTER

(71) Applicant: ST ENGINEERING IDIRECT (EUROPE) CY NV, Sint-Niklaas (BE)

(72) Inventors: Frederik Simoens, Oosterzele (BE); Dirk Breynaert, Sint-Niklaas (BE); Dieter Duyck, Sint-Niklaas (BE); Daniel Delaruelle, Sint-Niklaas (BE)

(73) Assignee: ST ENGINEERING IDIRECT (EUROPE) CY NV, Sint-Niklaas (BE)

( * ) Notice: Subject to any disclaimer, the term of this patent is extended or adjusted under 35 U.S.C. 154(b) by 461 days.

(21) Appl. No.: 17/286,232

(22) PCT Filed: Oct. 15, 2019

(86) PCT No.: PCT/EP2019/077834
§ 371 (c)(1),
(2) Date: Apr. 16, 2021

(87) PCT Pub. No.: WO2020/078936
PCT Pub. Date: Apr. 23, 2020

(65) Prior Publication Data
US 2021/0344415 A1 Nov. 4, 2021

(30) Foreign Application Priority Data
Oct. 18, 2018 (BE) .................................. 2018/5719

(51) Int. Cl.
*H04B 7/185* (2006.01)
(52) U.S. Cl.
CPC ..... *H04B 7/18517* (2013.01); *H04B 7/18513* (2013.01)

(58) Field of Classification Search
CPC ......................... H04B 7/18517; H04B 7/18513
See application file for complete search history.

(56) References Cited

U.S. PATENT DOCUMENTS 6,320,850 B1 11/2001 Perahia et al.
8,432,808 B1 4/2013 Dankberg et al.
(Continued)

FOREIGN PATENT DOCUMENTS

EP 1862014 A1 12/2007
EP 3291470 A1 3/2018

OTHER PUBLICATIONS

International Search Report and Written Opinion from PCT Application No. PCT/EP2019/077834, dated Nov. 20, 2019.
(Continued)

*Primary Examiner* — Dai Phuong
(74) *Attorney, Agent, or Firm* — Workman Nydegger (57) ABSTRACT

An earth station transmitter device is arranged for generating a signal to be transmitted to an earth station receiver device of a satellite communication system. The earth station transmitter device includes: shaping encapsulation for shaping and encapsulating downlink data traffic based on a modulation and coding decodable by an earth station receiver device. The shaping encapsulation is arranged to output downlink baseband frames, and further encapsulation is arranged to receive the downlink baseband frames and to generate uplink baseband frames by segmenting the downlink baseband frames based on a modulation and coding decodable by a satellite receiver device, encoding and modulation means for converting the uplink baseband frames into an uplink transmission signal using the modulation and coding decodable by the satellite receiver device.

16 Claims, 7 Drawing Sheets

(56) References Cited

U.S. PATENT DOCUMENTS

| | | |
|---|---|---|
| 8,447,226 B1 * | 5/2013 | Kuether ............ H04B 7/18517 |
| | | 455/575.4 |
| 8,831,121 B1 | 9/2014 | Qi et al. |
| 10,044,435 B2 | 8/2018 | Baudoin et al. |
| 2008/0165840 A1 | 7/2008 | Morris et al. |
| 2014/0016941 A1 * | 1/2014 | Coleman ............ H04B 7/18521 |
| | | 398/121 |
| 2017/0230890 A1 * | 8/2017 | Baudoin ............... H04L 1/0026 |
| 2018/0167133 A1 | 6/2018 | Choquette |
| 2018/0219613 A1 * | 8/2018 | Arnaud ............ H04N 21/43607 |
| 2021/0036766 A1 * | 2/2021 | Keshet ............... H04B 7/18513 |

OTHER PUBLICATIONS

Search Report from corresponding BE Application No. BE201805719, dated Jun. 13, 2019.

Feltrin et al., "Eutelsat QUANTUM-class satellite: beam hopping," 3rd ESA Workshop on Advanced Flexible Telecom Payloads, ESA/ESTEC, Mar. 21-24, 2016, 8 pages.

Gharanjik et al., "Gateway Switching in Q/V Band Satellite Feeder Links," IEEE Communications Letter, May 31, 2013, 5 pages.

Fenech et al., "Challenges of a flexible payload on the payload and operational software tools," 3rd ESA Workshop on Advanced Flexible Telecom Payloads, ESA/ESTEC, Mar. 21-24, 2016, 6 pages.

* cited by examiner

SATELLITE COMMUNICATION TRANSMITTER

FIELD OF THE INVENTION

The present invention is generally related to the field of satellite communication systems.

BACKGROUND OF THE INVENTION

Satellite communication services are important in various fields since many decades. Consider for example Internet over satellite for consumers, but also for enterprises (e.g. oil rigs) and government and defense applications.

Figure 1:
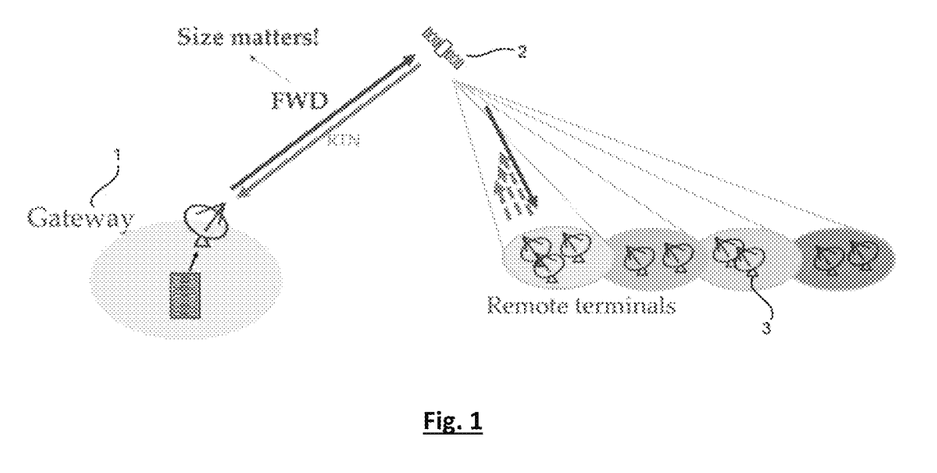
FIG. 1 illustrates a satellite communication system where a hub or gateway (1) communicates with multiple terminals (3) via a satellite (2).

One-way and two-way communication services are considered. In two-way satellite communication services there is a link from a hub to a terminal, called the forward link, and a link from the terminal to the hub, called the return link. In a one-way service, only the FWD link is used. A typical satellite two-way communication network is illustrated in FIG. 1. A hub or gateway (1) communicates with a terminal (3) via at least one satellite (2). In such a system multiple terminals may be covered through a single hub. A satellite communication service may contain several hubs. A hub may contain several transmitters and/or receivers, e.g. if the bandwidth needed in the forward link is larger than the bandwidth that can be transmitted from a single transmitter. The receive terminals to which the traffic can potentially be combined in a single frame, are grouped in a satellite network or satnet. These terminals decode a same carrier at the same time in a same contour. A satnet processor (e.g. a central processing unit (CPU) processor on a blade server) is responsible for handling forward and return (also referred to as inbound and outbound) traffic associated to a satnet. A blade server is a stripped-down server computer with a modular design optimized to minimize the use of physical space and energy.

A satellite communication system is considered wherein in the forward link a satnet processor (e.g. a processor on a blade server) multiplexes data (also referred to as traffic) to a group of terminals in a frame which is then sent to the modulator (e.g. over an Ethernet cable). Such a frame is for example a baseband frame but it can also be another type of frame. The two essential components of the satnet processor are referred to as a shaper and an encapsulator. The average speed or rate at which said frame is sent to the modulator, depends on the average rate at which data for this satnet is transmitted over the air (typically equal to a symbol rate of a transmitted carrier or a fraction of that in the case of time slicing, see DVB-S2 Annex M).

In this description reference is made to a symbol rate of the transmitted carrier. That carrier can possibly also be provided with a sharing mechanism, like e.g. time slicing, whereby the symbol rate of a carrier is shared (sliced) in multiple pieces and each of the pieces is used for different satnets. Each piece then corresponds to a virtual symbol rate, but for the simplicity of notation, 'virtual' is not used anymore in the remainder of the description.

The data in the frame from the processor is provided at a rate that is a function of a symbol rate slightly less (e.g. reduced by 0.1%) than the carrier symbol rate to avoid buffer overflows in the modulator, as a closed control loop including the modulator and satnet processor is challenging, given that the modulator is implemented in HW with its own clock domain, while the satnet processor with a bursty output is implemented in software. In other words, backpressure from the modulator to the satnet processor or server, which works in a different clock domain than the modulator and which could be connected to the modulator through an Ethernet cable for example, is not straightforward.

In the state of the art satellite communication systems, the absolute time instant at which packets are sent from the satnet processor to the modulator, is not important as long as the rate at which packets are sent, satisfies the above constraint, i.e. lower than the modulator symbol rate (e.g. reduced by 0.1%). Data for multiple satellite networks can be transmitted over the air from a single modulator either in a serial way (e.g. via time slicing in a single large physical carrier, see DVB-S2 Annex M) or in a parallel way (e.g. by transmitting multiple carriers over orthogonal frequencies; those multiple carriers can be present in a single beam or contour illumination). Hence, the satnet processor or multiple satnet processors send one or more data streams, belonging to multiple satellite networks, in a serial or parallel way to the modulator. These frames are then buffered in storage means in the modulator (e.g. in the case of time slicing, to guarantee a minimum time between frames from the same slice number), for example on a field programmable gate array (FPGA) or an application-specific integrated circuit (ASIC or chip). Subsequently each frame is encoded by the modulator to a forward error corrected (FEC) frame (called coding), mapped to a physical layer frame of symbols (called modulation) and pulse shaped to a baseband waveform. Hence, each baseband frame is associated to a modulation and coding (modcod). In DVB-S2 the number of coded bits of "normal" frames equals 64800 bits. Thus, the number of bits in a baseband frame, before encoding, has a length depending on the encoding rate, e.g. 2/3. Also, the number of symbols in an encoded mapped baseband frame depends on the number of bits mapped to a single symbol (e.g., 2 bits for QPSK, 3 bits for 8-PSK, 4 bits for 16-APSK constellations, etc.). This baseband waveform is finally upconverted onto a carrier frequency by an IQ modulator. Before performing the pulse shaping, the gateway transmitter typically registers the actual value of a reference clock in the modulator at the time instant the Start Of Frame (SOF) symbol gets pulse-shaped (see for example ETSI EN 302 307: "Digital Video Broadcasting (DVB); Second generation framing structure, channel coding and modulation systems for Broadcasting, Interactive Services, News Gathering and other broadband satellite applications", annex G.5). This value is then inserted in a placeholder for the network clock reference (NCR) of a subsequent frame before encoding (see for example FIG. 7 in Sec. 6.1 of ETSI EN 301 790 V1.5.1 (2009-05), "Digital Video Broadcasting (DVB); Interaction channel for satellite distribution systems"), such that all terminals can slave to this common value, which allows them to synchronize their return link transmissions. The modulator is configured (e.g. the symbol rate) by a local modulator processor.

An uplink refers to a link from an earth transmitting station to the satellite and a downlink to a link from the satellite to an earth receiving station. An inter-satellite link or inter orbit link (IOL) refers to a link from one satellite to another satellite.

In a bent-pipe satellite the received signal is processed in an analogue way (e.g. filtering, frequency conversion, amplification) with the main purpose to amplify the signal for transmission in the downlink. In a regenerative satellite the received signal is processed in a digital way. More specifically, the received signal is down-converted to baseband, carrier synchronization is performed and the waveform is matched filtered yielding a sequence of digital symbols. Mostly, the symbols are demapped to coded bits which are decoded to yield (in case of successful decoding) a baseband frame.

In regenerative satellites the noise and distortions experienced from the uplink transmission are removed by the matched filtering, demapping and decoding, in contrast to a bent-pipe satellite where amplification and filtering distortions are added onto the uplink signal. Hence, the total throughput that can be transmitted over a link with a regenerative satellite is typically higher than the total throughput that can be sent over a link with a bent-pipe satellite. Another benefit is explained next. In star networks without on-board processing, the forward feeder link or uplink bandwidth is a bottleneck. One of the reasons thereof is that the hub-to-satellite feeder link modcods are determined by the downlinks to the terminals and not by the feeder link quality, which is typically better (because the antenna sizes at the hub are larger than at the terminals). By allowing on-board demodulation and decoding, the efficiency over the feeder link can be improved, resulting in less bandwidth needed (which lifts the bottleneck situation of the forward feeder link bandwidth). As another advantage a regenerative satellite can read routing information included in the signal to determine to which receiver a signal must be sent. In some cases such routing is done in a second layer of the communication protocol.

In some satellite systems the receiver terminal can only be reached from the gateway via multiple satellites, in which those satellites communicate via IOLs. This is mostly done through regenerative satellites as otherwise a lot of noise is accumulated, and, even more important, routing information is often needed in case a satellite is able to communicate to multiple other satellites such that routing information needs to be fetched from a demodulated signal. In the case of IOLs both the forward (FWD) and return (RTN) links are operated over regenerative satellites. Without IOLs it may be preferred to have only the FWD link in regenerative satellites as operating the RTN link over regenerative satellites requires more satellite complexity.

A drawback of regenerative satellites is the increased complexity of payloads. Regenerative satellites are chosen when the benefits are deemed more important than the drawbacks. Regenerative satellites were recently also discussed in application US2018/167133, which is further discussed below.

Summarizing, the throughput over regenerative satellites is higher, important bottlenecks such as forward feeder link bandwidth are reduced and routing on-board the satellite (to determine to which other satellite a packet must be sent for example) is possible, but the cost of regenerative satellites is higher. This trade-off used to be negative for regenerative satellites but due to miniaturization of on-board processors the additional cost has significantly reduced, so that the trade-off is nowadays positive for regenerative satellites.

In static communication satellite payloads, a coverage area is constantly illuminated, even at times when less communication traffic is requested, thereby not efficiently exploiting the available physical resources. Instead, beam hopping satellite payloads (see the papers "Challenges of a flexible satellite payload on the payload and operational software tools", S. Amos et al., 3rd ESA Workshop on Advanced Flexible Telecom Payloads. March 2016, ESA/ESTEC, Noordwijk (NL), and "Eutelsat QUANTUM-class satellite: beam hopping", E. Feltrin et al., 3rd ESA Workshop on Advanced Flexible Telecom Payloads, March 2016, ESA/ESTEC, Noordwijk (NL)) offer the flexibility to dynamically redirect during operation payload resources (i.e. power, frequency, time) to the geographic locations, where receivers are requesting communication traffic at a certain moment in time. Beam hopping in satellite communications aims to increase the flexibility to direct communication traffic to the receivers (i.e. to the contours on earth where the receivers are located) where needed. A single beam hopper in a beam hopping satellite illuminates multiple contours on earth one after another. For example, assume there are three contours C1, C2 and C3. A possible sequence of illumination then is e.g. C1 C1 C2 C3 C2 C1 C3 C3 C1 C2. The sequence is periodically repeated. In this example, receivers in contour C1 get access to more satellite resources than those in contours C2 or C3. This way, flexible satellite resource allocation to contours is possible, which opens a whole range of market opportunities (e.g. sending more traffic to hot spots).

Typically, in a regenerative satellite the symbol rate of the carrier or carriers between the transmitting earth station and the satellite is different from the symbol rates used between a satellite and the receiver earth station. For example, gateways are very expensive, so very high bandwidths between gateways and satellites are used in the uplink of star networks (referred to as feeder links) in order to reduce the number of required gateways. Recent technologies even investigate the use of Q/V band for feeder links (see for example A. Gharanjik et al., "Gateway Switching in Q/V Band Satellite Feeder Links", IEEE Comm. Letters, vol. 17, no. 7, pp. 1384-1387, July 2013). However, downlinks from a satellite to a user or user links are typically more narrow band (i.e., a smaller symbol rate) in order to allow cheaper earth station receivers at the user side. Hence, it must be remembered that different symbol rates between uplink and downlink are default in regenerative satellites.

Based on traffic requests from users, based on jitter requirements, the adoption of a beam hopping or non-beam hopping satellite, based on link budgets and on the symbol rate, a user regularly (on frequent time instances) gets assigned to a certain modcod that is decodable by the user (depends on link budget)
  and a certain baseband frame (taking into account jitter, the priority class the traffic belongs to, the hopping plan from the beam hopping satellite, the need to send as little dummy data as possible).

This is done by the satnet processor. In a shaping process an estimate of the total available bit rate that can be transmitted is divided over the users requesting traffic, in a "fair" (taking into account jitter, the contract between the provider and the customer, the hopping plan, etc.) way. In the encapsulation process these bits are then inserted in baseband frames. Typically, the modcods are sorted from the lowest modcod to the highest modcod. High and low modcod refer to the spectral efficiency associated with that modcod, which is high and low, respectively. The baseband frame length corresponding to a modcod is fixed. When there are not enough bits to fill a baseband frame corresponding to a low modcod, the bits corresponding to a higher modcod are inserted in the baseband frame corresponding to a lower modcod, in order to avoid dummy data to be included in that frame, which would be a waste of efficiency. This is acceptable as the user that can decode this higher modcod can for sure also decode the lower modcod. However, that user occupies more bandwidth than estimated at first (as a part of its bits are transmitted via lower modcod with lower spectral efficiency). Hence, in the next shaping round a bit less capacity is foreseen such that on average, the carrier rate throughput is respected and buffers in the FPGA are not overflowing. Each baseband frame is finally encapsulated with the corresponding header indicating the modcod (and thus the encoding rate and the modulation) to be used for that frame (and its associated baseband frame length). More information on shaping can for example be found in EP 1 862 014 B1.

Hence, shaping/encapsulation is an adaptive and iterative process combining many parameters, among which system parameters such as traffic requests, operational link parameters and jitter requirements. Such shaping is also dynamic and can change over time, depending on customer needs, varying jitter requirements, varying network congestion, etc. It operates over a blade server which consumes power and occupies space, which is to be avoided on-board the satellite.

The link parameters are variable, for example due to changing weather conditions. Therefore, a particular modcod may not be decodable anymore, for example in case it is raining. In that case a lower encoding rate can be more optimal, as it allows decoding more errors. Based on the inferred link parameters by the receiving earth station (referred to as ACM monitoring), an adaptive coding and modulation (ACM) controller (or in short, ACM control) will propose a new modcod for the later frames to be sent to said receiving earth station. The new modcod can be different from the previous modcod if the link parameters have changed. The ACM controller can be located in the receiving earth station or near the transmitting earth station and receives as input inferred link parameters from the receiving earth station (e.g. via the return link of a satellite communication network). In fact, the ACM controller output is a series of modcods, one for each receiving earth station. This list of modcods is an input to the shaper and encapsulator.

When transmitting over bent-pipe or analogue satellites, the earth station link parameters include the noise and distortion components from both the uplink, the satellite payload and the downlink. A modcod achievable over that link from transmitting to receiving earth station is proposed by the ACM controller.

When transmitting over regenerative satellites, the modcod for the uplink is different from the modcod for the downlink, as there is also a demodulator on-board the satellite. The link seen by the satellite receiver, i.e. the uplink, is different from the link seen by the downlink receiver, the receiving earth station. Combining ACM for both the uplink and downlink, through shaping encapsulation, and regenerative satellites is very challenging. In fact, to date, ACM techniques have not been applied in regenerative satellite systems (see background in US2018/167133).

In US2018/167133 ACM in the uplink or ACM in the downlink is introduced for regenerative satellites. Remarkably, ACM in both links simultaneously is not discussed. It is explained that, for ACM in the downlink, the downlink modcod is signalled by the transmitting earth station to the satellite, such that the satellite knows which modulation and coding is to be applied. At this moment, there are two possibilities: either the same modcod as in the downlink is operated in the uplink or a different modcod (and a different symbol rate). For the first option the uplink is assumed to be always better than the downlink, such that it can receive the same modcod. This is of course not true, e.g. in the case of a rain cloud between the transmitting earth station and the satellite. In the second case those new modcods correspond to new baseband frames with new bit and symbol lengths. Consequently, a new encapsulation stage is needed to fill the downlink carrier in an optimal way, without sending too much dummy data. Since shaping and encapsulation are performed in an adaptive and iterative way, also a shaping stage is needed.

For example, the following simple case is considered. The uplink modcod is 32-APSK 5/6. This corresponds to a baseband frame before encoding with length 54000 bits. The uplink shaper/encapsulator filled one baseband frame for terminal A and the subsequent baseband frames for other terminals. The downlink modcod for terminal A is 16-APSK 2/3, which corresponds to a baseband frame before encoding with length 43200. The other terminals can only decode 8-PSK 5/6, which corresponds to a baseband frame before encoding with length 54000. The data for terminal A sent in the uplink with a 32-APSK 5/6 modcod does not fit in one baseband frame for the downlink sent with a 16-APSK 2/3 modcod. More specifically, 43200 bits can be sent in a first 16-APSK 2/3 frame and the remainder has to be sent in a second baseband frame. However, sending this remainder in a 16-APSK 2/3 frame is not efficient as the rest of the frame must be filled with dummy data as no other terminal can decode the 16-APSK 2/3 frame. Hence, it is best that the remainder of the data is sent in an 8-PSK 5/6 frame as this frame can be filled with data for other terminals as well, so that no dummy data is sent, thus, no useful bandwidth is wasted.

In US2018/167133 or other prior art literature there is no specific mention of how to perform the shaping encapsulation for up- and/or downlink. Thus, the prior art seems to suggest that the shaping/encapsulation must occur like it always does today, at the transmitter side of a link. This implies that the shaping encapsulation for the downlink must happen on-board the satellite. The prior art neither mentions anything on the impact of regenerative satellite on the slaving from terminals on the NCR inserted in packets by the gateway transmitter. There are several reasons why such shaping/encapsulation on-board the satellite is problematic:

the jitter specs change when transmitting different modcods for the downlink, which becomes problematic to take into account in the case a shaper/encapsulator for the downlink operates on-board. It is also difficult to take into account new priority classes of traffic for example if the shaper is on-board the satellite and thus more difficult to update.

shaping/encapsulation is executed on a processor consuming non-negligible power and occupying space, which is problematic on-board a satellite.

the throughput that can actually be transmitted over a link, in this case the downlink, is only known after shaping encapsulation, as due to not-completely filled baseband frames, the throughput may slightly decrease; in the case of performing the downlink shaping encapsulation on-board, more margin would have to be taken over the estimated throughput of the downlink in order to make sure that the uplink throughput never exceeds the downlink throughput to avoid overflowing buffers on-board the satellite;

there is a higher risk to be non-compatible with future requirements.

In EP3291470 a transceiver for a satellite is presented that requires reduced computational power for processing the uplink data stream it receives, while maintaining the error correction capabilities. It relates as well to a satellite system using a regenerative payload with end-to-end FEC protection. Static modcods are assumed, i.e. modcods wherein no adaptive modulation and coding is applied. Further, only a single point-to-point link between gateway and terminal is considered.

U.S. Ser. No. 10/044,435 B2 is concerned with transparent on-board routing of data packets in a communication system with at least one regenerative satellite. A transmitting station segments high bit rate data streams to obtain packets having the structure of DVB-S2 baseband frames and adds for each packet an on-board routing label. This label contains an identifier of the destination receiving station. Using the label allows for a significant reduction of the on-board processing in the satellite. There is, however, no mention of how to perform shaping and demodulation.

There is thus a need to avoid performing shaping/encapsulation on-board the satellite. Still, shaping encapsulation must be performed as shown in the illustrative example above, in order to avoid too much dummy data to be transmitted over a link.

SUMMARY OF THE INVENTION

It is an object of embodiments of the present invention to provide for an earth station transmitter device for use in a satellite communication system wherein shaping/encapsulation on-board the satellite is avoided. It is a further object to provide for a satellite communication system comprising such an earth station transmitter device.

The above objective is accomplished by the solution according to the present invention.

In a first aspect the invention relates to an earth station transmitter device arranged for generating a signal to be transmitted to an earth station receiver device of a satellite communication system, said earth station transmitter device comprising shaping encapsulation means for shaping and encapsulating downlink data traffic based on a first modulation and coding decodable by an earth station receiver device, said shaping encapsulation means arranged to output downlink baseband frames,
 further encapsulation means arranged to receive said downlink baseband frames and to generate uplink baseband frames by segmenting said downlink baseband frames based on a second modulation and coding decodable by a satellite receiver device,
 encoding and modulation means for converting said uplink baseband frames into an uplink transmission signal using said second modulation and coding decodable by said satellite receiver device.

The proposed solution indeed allows for avoiding shaping/encapsulation on-board the satellite. The earth station transmitter device of the invention takes care of both the shaping and encapsulation of the downlink data traffic, whereby downlink baseband frames are obtained, and the encapsulation of those downlink baseband frames in uplink baseband frames. After encoding and modulation of the uplink baseband frames one obtains the signal to be transmitted to a satellite.

In a preferred embodiment the earth station transmitter device comprises a controller arranged to convey the second modulation and coding decodable by the satellite receiver device based on information related to link quality received from the satellite receiver device.

In an advantageous embodiment the further encapsulation means is arranged to provide feedback to the shaping encapsulation means in case the uplink throughput capacity is exceeded by the downlink data traffic.

In one embodiment the earth station transmitter device comprises downlink encoding means to encode the downlink baseband frames and the further encapsulation means is arranged to process the encoded downlink baseband frames.

In another aspect the invention relates to a satellite communication system comprising an earth station transmitter device as previously described and a satellite receiver device arranged for receiving the uplink transmission signal and comprising demodulation and decoding means for converting the uplink transmission signal into uplink baseband frames and decapsulation means for converting the uplink baseband frames into the downlink baseband frames.

In a preferred embodiment the satellite communication system comprises a satellite downlink transmitter device and earth station receiver device, whereby the satellite downlink transmitter device is arranged to receive the downlink baseband frames from the satellite receiver device and comprises encoding and modulation means to convert the downlink baseband frames into a downlink transmission signal using the first modulation and coding decodable by the earth station receiver device.

Advantageously, the satellite downlink transmitter device comprises a network clock reference restamper arranged to replace one or more bit values inside the downlink baseband frames by bit values representative of a timestamp value.

In one embodiment the earth station receiver device is then arranged to use a clock reference based on the timestamp value to organize transmission from the earth station receiver over a return link.

In another embodiment the controller of the earth station transmitter device is arranged to receive the link quality information from the earth station receiver device and/or from the satellite receiver device.

In embodiments of the invention the satellite receiver device is comprised in a first satellite and the satellite downlink transmitter device is comprised in a second satellite different from the first satellite. In an advantageous embodiment the second satellite is a beam hopping satellite.

In further embodiments the second satellite comprises for return link communication a receiving satellite demodulator implemented as a multi-carrier burst demodulator. The first satellite is preferably arranged to transmit a downlink signal to an earth station receiver device for return link communication.

In embodiments the first satellite comprises, for return link communication, encoding and modulation means for converting baseband frames demodulated in the second satellite into the downlink transmission signal to the earth station receiver device using a modulation and coding that can be decoded by the earth station receiver device.

Preferably the earth station receiver device comprises a return link controller arranged to receive signal parameters and to control the quality of the return link communication based on the received signal parameters. Advantageously the return link controller is adapted to reduce the return link capacity if there are less dummy frames in the downlink transmission signal than a given threshold level.

In preferred embodiments the satellite downlink transmitter device is arranged for inserting a network clock reference in the forward link.

In a further aspect the invention relates to a satellite communication system comprising an earth station transmitter device as previously described, one or more earth station receiver device, satellite receiver means for receiving an uplink transmit signal from said earth station transmitter device and satellite transmitter means for transmitting a downlink transmit signal to said earth station receiver device, whereby said satellite receiver means comprises demodulation and decoding means for converting the uplink transmission signal into uplink baseband frames and decapsulation means for converting the uplink baseband frames into downlink baseband frames and whereby said satellite transmitter means comprises encoding and modulation means to convert the downlink baseband frames into a downlink transmission signal using modulation and coding decodable by the earth station receiver device. The satellite communication system further comprises satellite receiver means for receiving an uplink transmit signal from the one or more earth station receiver device and satellite transmitter means for transmitting a downlink transmit signal to the earth station transmitter device. This satellite receiver means comprises demodulation and decoding means for converting the uplink transmission signal into return link baseband frames for each of the uplink transmit signals transmitted from the one or more earth station receiver devices, multiplexing means to multiplex said return link baseband frames corresponding to the one or more earth station receiver devices into a single stream of return link baseband frames, while the satellite transmitter_means comprises encoding and modulation means to convert the single stream of return link baseband frames into a downlink transmission signal using modulation and coding decodable by the earth station receiver device. The satellite communication system is thus adapted for return link communication from the one or more earth station receiver device to the earth station transmitter device.

In one embodiment of the satellite communication system said satellite receiver means and said satellite transmitter means in the forward and return link, respectively, are comprised in one satellite. In other embodiments there are two (or more) satellites. For example, one satellite may comprise the satellite transmit and receiver means for communication with said earth station receiver device and another satellite may comprise the satellite transmit and receiver means for communication with said earth station transmitter device. In that case the communication between the two satellites occurs via an inter-satellite link.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

A typical realization of data communication over satellite is based on a star network in which a gateway transmitter transmits in the so-called forward (FWD) link over the satellite to multiple terminal receivers. In the case of interactive communication, the terminal transmitters transmit back in the so-called return (RTN) link over the satellite towards a gateway receiver. If needed (e.g. if the bandwidth needed in the forward link is larger than the bandwidth that can be transmitted from a single transmitter) more transmitters and/or receivers are used at the gateway.

With earth orbit constellations lower than geostationary earth orbit satellites, such as medium and low earth orbits (MEO and LEO), the geographical area covered by a satellite is lower due to the smaller altitude of the satellite. In addition, spot beams are more and more used as the corresponding antennas have more antenna power gain. As a consequence, multiple satellites may be needed to reach the destination user from the gateway. The satellites are connected via IOLs.

Figure 2A:
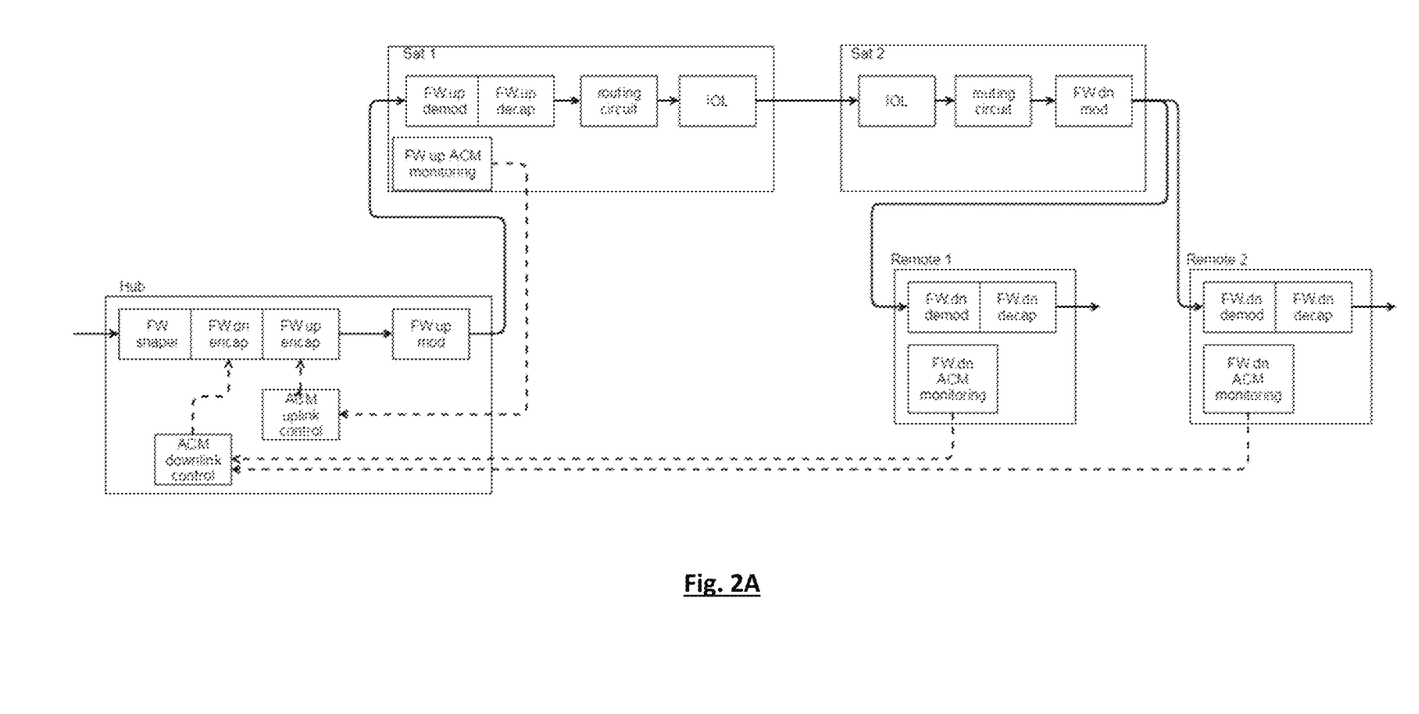
FIG. 2A illustrates an embodiment of an earth station transmitter device and satellite communication system according to the invention.

In this invention a satellite network is considered with at least one transmitting earth station, at least one regenerative satellite, possibly other satellites and at least one receiving earth station. The satellite transmitting to the receiving earth station is a regenerative satellite and can be a beam hopping satellite, but the invention is not limited to beam hopping satellites. FIG. 2A illustrates such a network with a transmitting earth station (1), a first satellite (Sat1), a second satellite (Sat2) receiving from the first satellite, and a receiving earth station (3) receiving from the second satellite. The first and second satellites are regenerative satellites, demodulating and decoding the received signal and encoding and modulating a new signal. The second satellite can be a beam hopping satellite. In the illustrative star network example of FIG. 2A, one uplink carrier is finally downlinked through one downlink carrier. The uplink carrier is received by satellite 1 (Sat1) and consecutively transmitted over an inter orbit link to satellite 2 (Sat2), where it is downlinked to remote terminals. Since the uplink carrier packets are all downlinked from the same satellite, there is a fixed circuit linking the receiver for that carrier on satellite 1 with the inter orbit link transmitter on satellite 1. Other uplink carriers may be circuited to other inter orbit link transmitters. Similarly, at satellite 2, there is a fixed circuit connecting the IOL receiver with the downlink transmitter on satellite 2 for that carrier.

Obviously, the invention is not limited to the example shown in FIG. 2A. Another example could be that one uplink carrier is downlinked over multiple downlink carriers. Depending on signalling present in the packets of the carriers, the packet is routed to the appropriate downlink carrier. Hence, the routing circuit is then replaced by a layer 2 switching mechanism, which may be performed in an FPGA on-board the satellite or simply using layer 2 Ethernet switches.

In the forward link of star networks with one or more regenerative satellites, the uplink from the gateway to a first satellite is typically less noisy than the downlink from a satellite to a user, as the gateway transmitter has in general a larger antenna than a user receiver. Hence, the throughput is in general limited by the downlink. The throughput of the complete uplink and complete downlink must be equal. Put differently, the throughput sent over the FWD link to a single terminal, is of course the same for the uplink and downlink.

The present invention therefore proposes to first perform shaping for the worst link, typically the downlink. This shaping is denoted by forward (FW) shaping. The shaping is always performed at the gateway transmitter. Then, encapsulation is performed for the downlink using the downlink modcod information received from the ACM controller (based on feedback from the terminal receiver, e.g. over the return link). This encapsulation is denoted FW.dn encapsulation. This FW shaping and FW.dn encapsulation is based on the same requests as in prior art star networks without regenerative satellites today (traffic requests from users, based on jitter requirements, the adoption of a beam hopping or non-beam hopping satellite, based on link budgets and on the symbol rate), with the difference that said link budget and symbol rate correspond to the downlink link budget and downlink symbol rate (instead of the overall link budget in bent-pipe satellites). The output of the FW shaping and FW.dn encapsulation is a sequence of baseband frames each corresponding to a modulation and coding (modcod), filled with bits for different users. The bits are fairly distributed over the users. The FW.dn encapsulator can also take into account that the frames sent by the modulator are of different types. That is, the frames sent by the modulator can be of various types, including normal DVB-S2 or DVB-S2X frames or DVB-S2X superframes (cfr. DVB-S2X Annex E). E.g. a superframe consists of several baseband frames of the same or different modcods.

In case the satellite transmitting over the downlink is a beam hopping satellite (see the papers "Challenges of a flexible satellite payload on the payload and operational software tools" (S. Amos et al., 3rd ESA Workshop on Advanced Flexible Telecom Payloads. March 2016, ESA/ESTEC, Noordwijk (NL)) and "Eutelsat QUANTUM-class satellite: beam hopping" (E. Feltrin et al., 3rd ESA Workshop on Advanced Flexible Telecom Payloads, March 2016, ESA/ESTEC, Noordwijk (NL)) the frames at the output of the FW.dn encapsulator can be superframes that include a hopping ID indicating in which hop the superframe has to be transmitted. Furthermore, the encapsulator also takes into account the number of superframes that fit in a given hopping time slot duration.

Summarizing, the FW shaping and FW.dn encapsulator take into account all link aspects of the downlink.

According to the present invention, the baseband frames output by the FW.dn encapsulator are next provided to the uplink encapsulator (7). The uplink encapsulator is denoted FW.up encapsulator. The modcod depends on the uplink modcod information received from the ACM controller (based on feedback from the satellite demodulator over the return link from the satellite to the gateway receiver).

The FW.up encapsulator sees the input bits from the FW.dn encapsulator simply as a sequence of bits, not as baseband frames, and encapsulates them for the modcod determined by the ACM controller of the uplink, based on the uplink link quality. This may cause downlink baseband frames to be cut in pieces but this can be perfectly reassembled on-board the satellite, e.g. based on the baseband frame headers present in the sequence of bits received from the FW.dn encapsulator. In order to receive an indication of the uplink link quality at the gateway, ACM feedback from the ACM monitoring on-board the satellite is needed, which may be conveyed via the return link communication channel between the satellite and the gateway.

There is only one shaper, as there is only one limiting pipe, which is in the typical case the downlink. The uplink encapsulator is a rather simple encapsulator just making sure that the baseband frames sent in the uplink correspond the uplink modcod (which corresponds to the uplink quality).

Figure 2B:
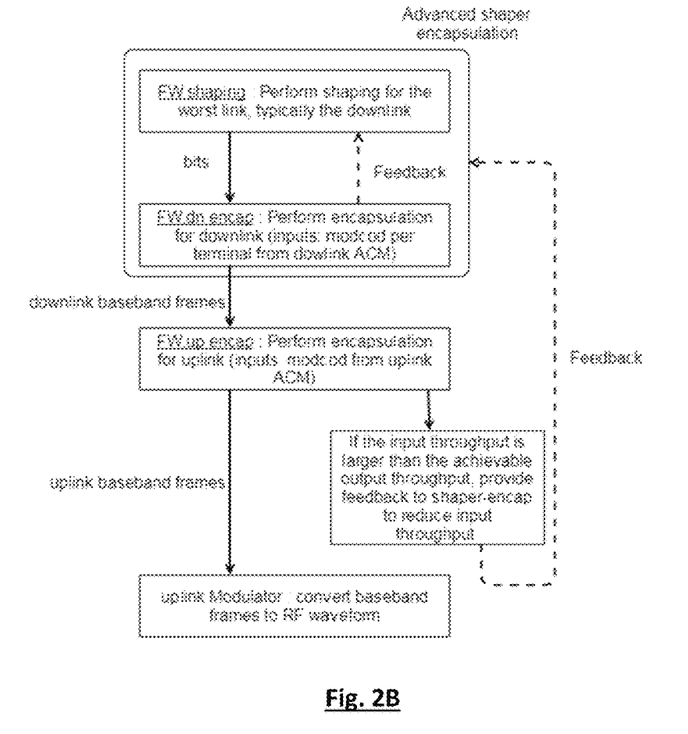
FIG. 2B illustrates the operation at the hub and FIG. 2C the operation in the satellite.

In case that the uplink throughput is lower than the downlink throughput (e.g. due to uplink fading, e.g. caused by a rain cloud between the gateway transmitter and the satellite), the FW.up encapsulator provides feedback or backpressure to the FW shaper and FW.down encapsulator in order to reduce the data rate until it is smaller than the uplink throughput. In such case the on-board modulator inserts dummy data (e.g. a frame of dummy symbols provided by the physical layer signalling in the case of DVB-S2, or dummy symbols or dummy frames of any type in the case of a DVB-S2X super frame) in the downlink data stream. FIG. 2B shows in a flow chart the operation at the hub.

The uplink encapsulator output is provided to the gateway modulator (9), that maps the bits onto a waveform. In the case that the downlink throughput is smaller than the achievable uplink throughput, the remainder of the uplink throughput is filled with dummy data.

Figure 2C:
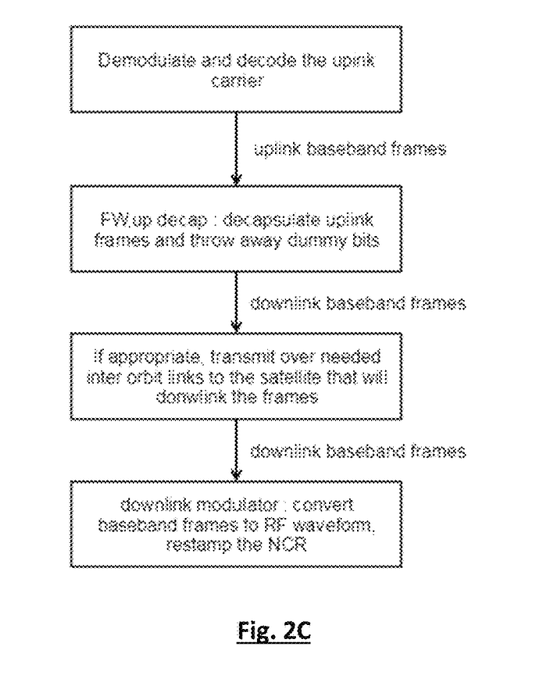

On-board the satellite, the waveform sent from the gateway modulator is demodulated and decoded. After decoding, the headers of the uplink baseband frames are removed, corresponding to FW.up decapsulation. The output are the downlink baseband frames, which can be directly provided to the satellite modulator (including encoding and modulation). If needed, routing information (e.g. layer 2 routing) can be retrieved from signalling in the downlink baseband frames. The modulated waveform can be transmitted on the downlink or to another satellite on an IOL depending on the routing information. At some moment, a downlink waveform will be transmitted on the downlink by a satellite. FIG. 2C shows in a flow chart the operation in the satellite.

A major difference with transmission over non-regenerative satellites is the NCR synchronization of the terminals. In non-regenerative satellites, the delay on-board the satellite of the waveform is constant. Hence, the time-difference between packets at the modulator output equals the time difference between packets at the input of the terminal receivers. Including a reference time (corresponding to NCR restamping) at the gateway modulator output is thus sufficient to convey this reference time to all terminal receivers. In regenerative satellites, however, the delay on-board the satellite is not constant as there is a demodulator with synchronization with varying buffer sizes and a modulator with an unknown exact symbol rate. That downlink symbol rate may even be different from the uplink symbol rate, and dummy data may be inserted in between two data frames. The NCR reference sent from the gateway would result in an unstable reference at the receivers. Therefore, NCR restamping can only happen on-board the satellite. The terminals slave to the NCR reference included on-board the satellite which allows all of them to slave to the same time reference and which consequently allows all of them to synchronize their transmission according to an agreed time-frequency plan signalled by the hub, as they have the same notion of time thanks to the same time reference. Based on the terminal packet arrival times at the gateway in the return link, the hub signals delta times to the terminals (achievable for example by changing the symbol rate or the start time of transmission).

Figure 3A:
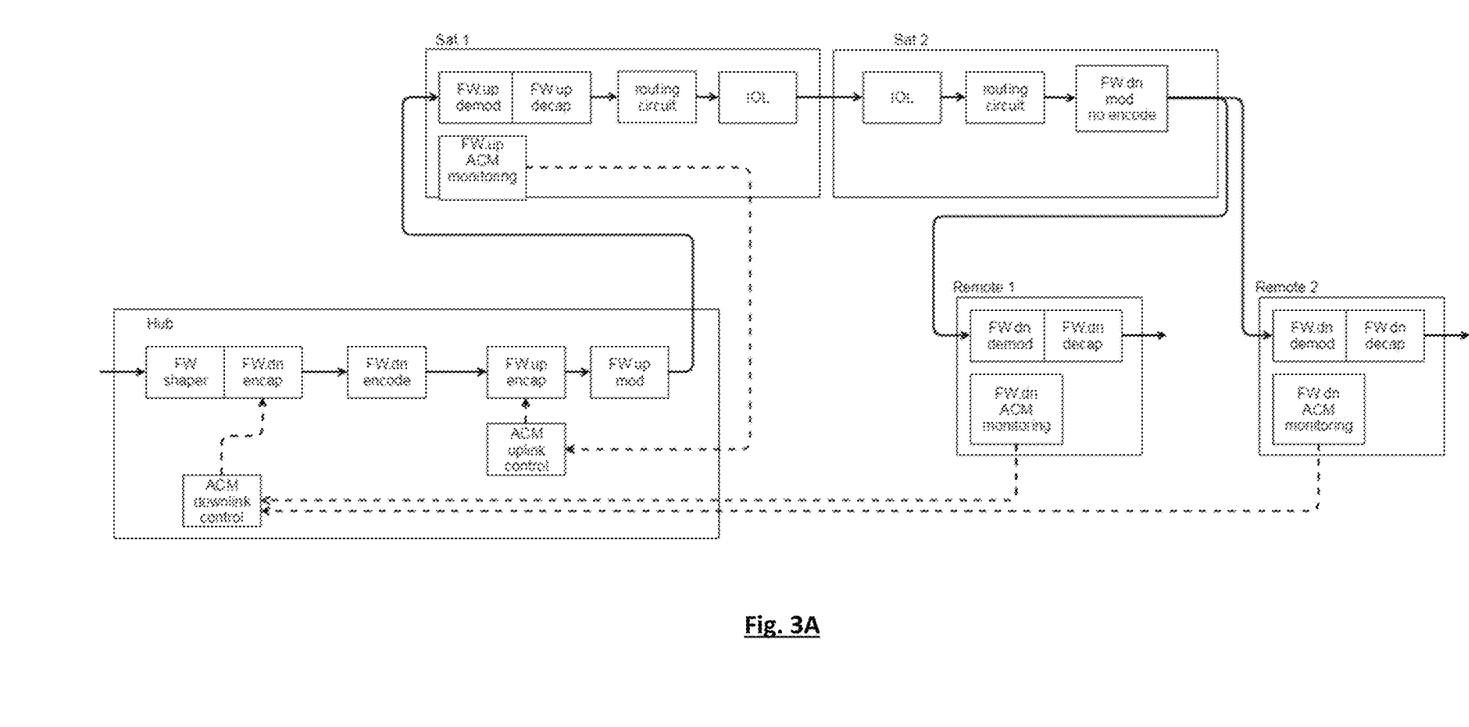
FIG. 3A illustrates another embodiment of an earth station transmitter device and satellite communication system according to the invention.
Figure 3B:
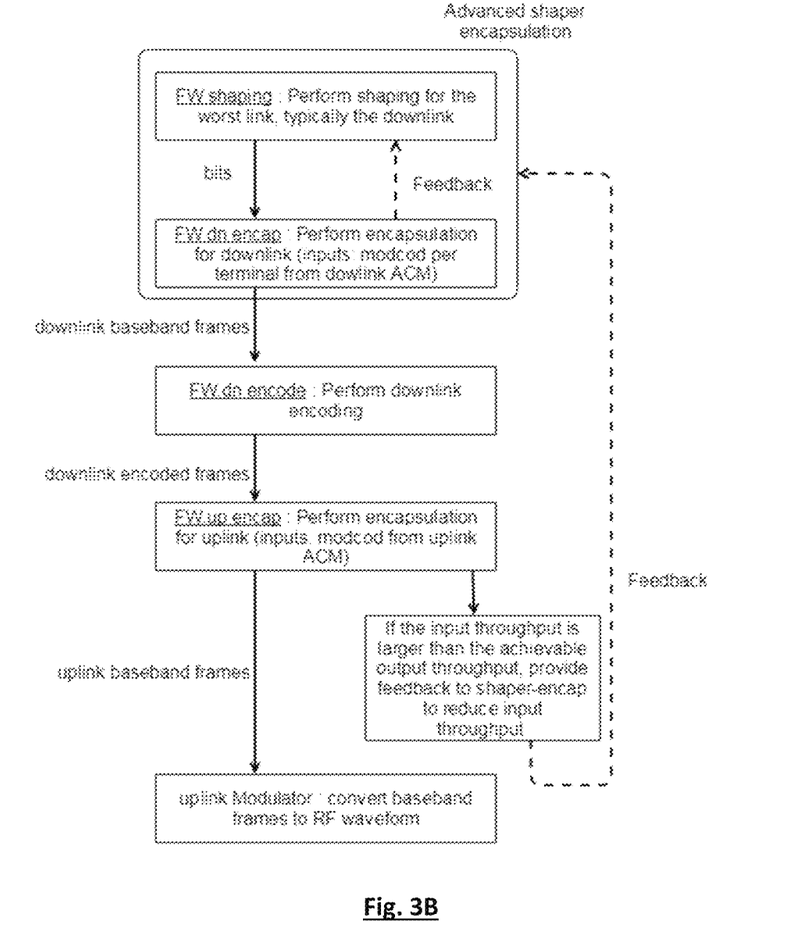
FIG. 3B illustrates the operation at the hub and FIG. 3C that in the satellite.
Figure 3C:
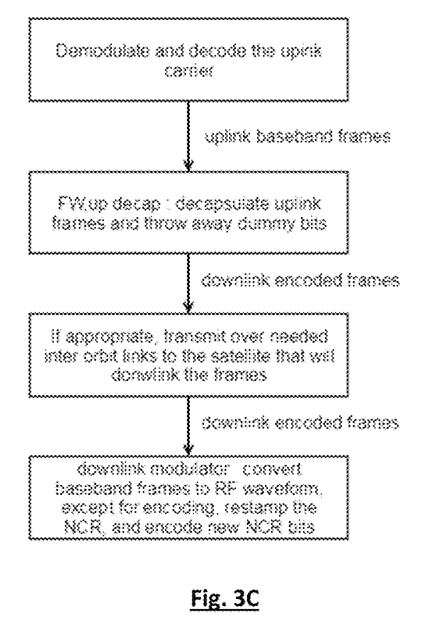

In another aspect of the invention the channel encoding (13) for the downlink is also performed at the gateway transmitter, instead of on-board the satellite. This is illustrated in FIG. 3A. This yields a reduced satellite complexity and power consumption, since channel encoding is typically one of the most resource consuming parts of a modulator. Sometimes, the uplink is large enough to include the redundant bits added by the downlink encoding, already in the uplink. Note that this requires an uplink that is typically 20% larger in throughput than the downlink (more specifically 1/Rc, where Rc is the coding rate of the downlink; e.g. for a coding rate of 4/5, the uplink throughput needs to be 5/4 of the downlink throughput). FIG. 3B shows in a flow chart the operation at the hub and FIG. 3C that in the satellite.

Sometimes data bits need to be changed on-board the satellite. The most important example is the above-mentioned NCR restamping. Thus, in a further aspect of the invention, the redundant bits added by the channel encoding for the downlink, performed in the gateway, are modified on-board the satellite to reflect altered data bits originating in the satellite. It will be clear to those skilled in the art of channel coding, that this still permits reduced satellite complexity and power consumption: firstly, code frames where no data bits are altered require no recomputing of redundant bits and secondly, in the common case where the channel code is linear binary and the new data bits originating in the satellite substitute data bits set to 0 in the gateway, it is sufficient to encode only the altered data bits and add the resulting new redundant bits modulo-2 to the redundant bits provided by the gateway.

In the return link of such a star network (where many terminal transmitters transmit to few gateway (1) receivers), the terminals (3) share the satellite resources, meaning that the terminals must be organized to transmit orthogonal signals (not interfering in time or frequency). This is typically achieved by slaving all terminals to a common gateway reference such as the network clock reference (NCR) which is a counter increasing at an internal clock rate synchronized with GPS time, cf. DVB-S2 Annex G.S. This is realized by including periodically the current value of the NCR in the forward transmission signal.

A typical return link shares the available spectrum in a multiple frequency time division multiple access (MF-TDMA) framework. Each terminal is assigned a portion of time and frequency spectrum for transmission. The allocation of time and frequency slots is performed in a central control unit at the hub and can be visualized with the so-called time/frequency plan. The control unit allocation is based on terminal capabilities and terminal capacity requests. The control unit also manages capacity to have a fair distribution of the available capacity in congested cases where not all capacity requests can be fulfilled. In order to have flexibility in resource assignment to a given terminal, terminals can be assigned to a different amount of time slots and frequency bins over time (here refer to DVB-RCS2).

Figure 4:
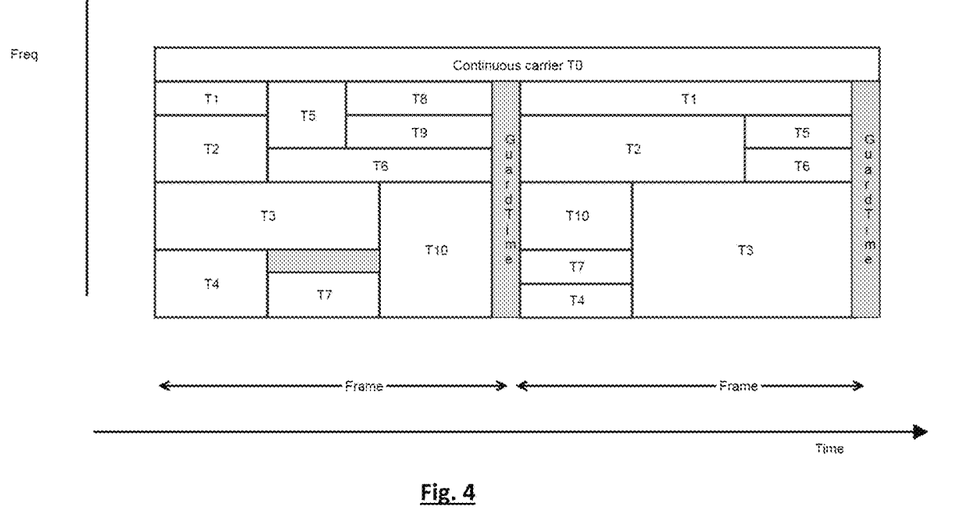
FIG. 4 illustrates a typical return link time/frequency plan.

A typical return link time/frequency plan is shown in FIG. 4, wherein Ti refers to carrier number i. The time/frequency plan is optimized on a frame by frame basis for optimal usage of spectrum given the available capacity and the terminal traffic needs. For optimal efficiency the unused area in the matrix representation of the time frequency plan should be minimised. On top of time and frequency grid optimization, terminals receive a power density and modcod via the ACM algorithm based on their individual link budget, terminal transmit power capabilities and traffic needs. Terminals with large and small capacity demands typically coexist in the same satnet, thus in the same time-frequency frame. Traffic demand for each terminal can change rapidly in a bursty manner. As a result of all these optimizations, the waveform incidenting the receiver can be modulated with a rapidly changing modcod (selected from a large set of modcods), various burst lengths and various symbol rates, which requires an advanced multi-carrier burst demodulator to demodulate this dynamic multi-carrier waveform in an efficient way.

Typically, a channelizer time-multiplexes all user traffic after the ADC in the multi-carrier burst demodulator. An example is found in U.S. Pat. No. 8,831,121. The channelizer output is typically a serial single stream of samples, consecutively containing bursts (each burst containing fractions or an integer number of coded frames of a particular user), which are around the central frequency of the carrier sent by a particular terminal. This stream of samples is then matched filtered, demapped to a stream of log-likelihood ratios and finally decoded, resulting in baseband packets, one per decoded code word sent by a particular user. The baseband packets are subsequently decapsulated.

Signal parameters such as time-offsets, frequency-offsets, signal-to-noise ratio monitoring and so on, are used by the central control unit to signal adjusted transmit parameters to the terminals, such as an adjusted start time of transmission, adjusted frequencies, another power or symbol rate.

Using regenerative satellites in the return link can have the above-mentioned throughput advantages and may even be absolutely required in case routing information is needed when using IOLs.

Figure 5:
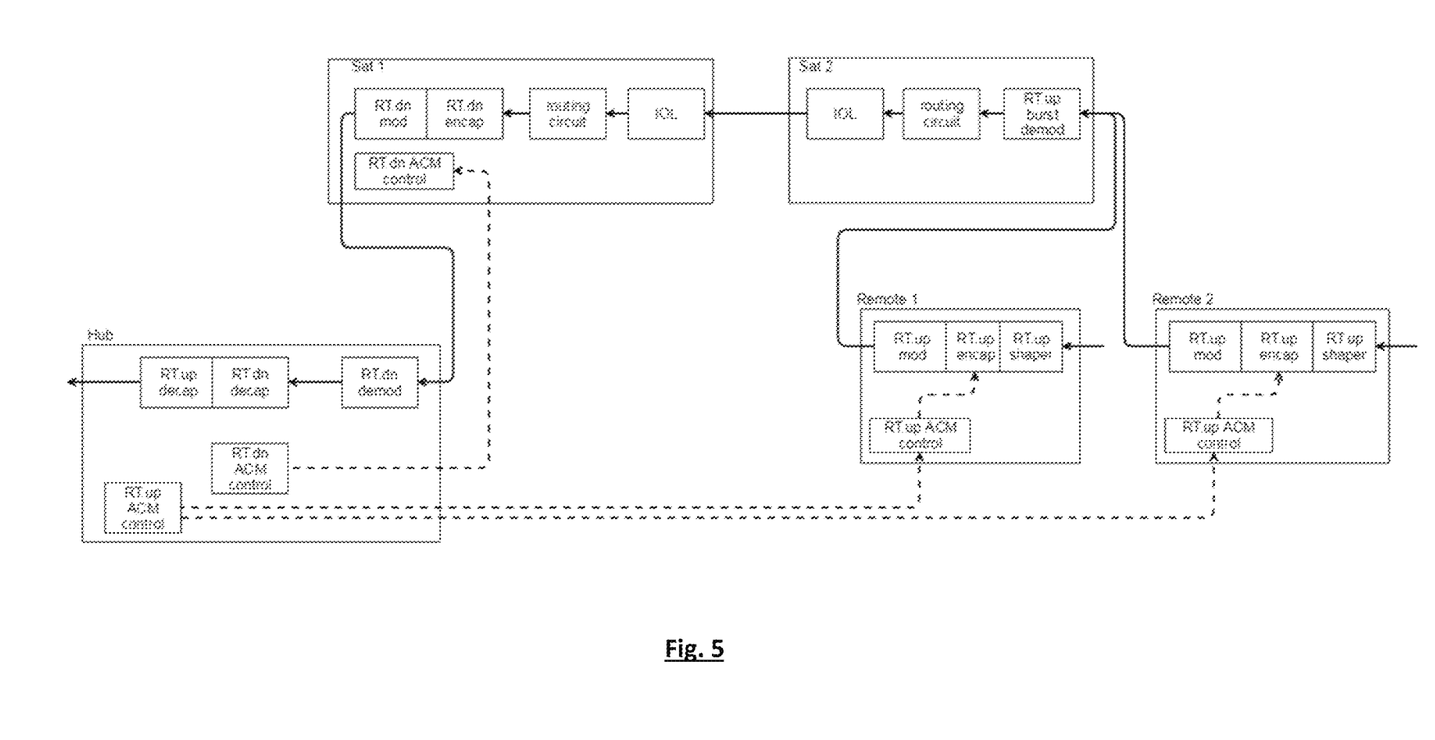
FIG. 5 illustrates a satellite communication system arranged for performing return link communication from an earth station receiver device to an earth station transmitter device.

In the case of operating the return link over at least one regenerative satellite, the present invention proposes, as illustrated in FIG. 5, to have a multi-carrier burst demodulator in the receiving satellite demodulator of the uplink from the terminals to the satellite. This multi-carrier burst demodulator outputs the baseband packets, together with all required signal parameters for the central control unit. These baseband packets are then transported to the satellite downlink modulator, possibly over IOLs, just like in the forward link, which can be over layer 2 (e.g. via Ethernet) or over higher layers (e.g. through UDP packets over layer 4). The stream of baseband packets is then encapsulated (RT.dn encap), modulated and transmitted to the hub receiver device through a single carrier with a modcod that can be demodulated and decoded by the hub receiver depending on the link quality of this downlink (satellite modulator to hub receiver). Typically, this single carrier is not completely filled with the encoded and modulated baseband packets. The remainder is then filled with dummy physical layer (PL) frames.

A hub single carrier demodulator then demodulates, decodes and decapsulates (RT.dn decap) the single carrier and outputs the baseband packets, which are consecutively decapsulated (RT.up decap). The layer 2, 3 or 4 link between the multi-carrier burst demodulator on the receiving satellite demodulator and the decapsulator RT.up decap in the hub receiver link is transparent for that decapsulator and central control unit. The central control unit signals, via the forward link, adjusted transmit parameters to the terminals based on the signal parameters forwarded by the multi-carrier burst demodulator in-band the single carrier. Just like in the forward link, the signaling contains also all ACM modcod information needed such that terminals and satellite transmitter use the appropriate modulation and coding that is decodable by the satellite burst demod receiver and hub receiver, respectively.

In the present invention the central control unit also reduces the return link capacity (resulting in a reduced modcod or symbol rate for the return link carriers sent by the terminals) if the amount of dummy frames observed in the downlink part of the return link drops below a particular threshold. This is to avoid data loss in the satellite segment, which may occur for example in the case of fading in the downlink, after which the throughput sent from the terminals to the satellite in the uplink exceeds the throughput of the downlink. This is reflected by a decreasing number of dummy PLframes in the downlink, which should never reach zero, to avoid the above-mentioned data loss.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An earth station transmitter device arranged for generating a signal to be transmitted to an earth station receiver device of a satellite communication system, said earth station transmitter device comprising:
shaping encapsulation means for
shaping downlink data traffic based on an estimate of a total bit rate available for said downlink data traffic and
encapsulating said downlink data traffic based on a first modulation and coding decodable by an earth station receiver device,
said shaping encapsulation means arranged to output downlink baseband frames,
further encapsulation means arranged to receive said downlink baseband frames and to generate uplink baseband frames by segmenting said downlink baseband frames based on a second modulation and coding decodable by a satellite receiver device,
encoding and modulation means for converting said uplink baseband frames into an uplink transmission signal using said second modulation and coding decodable by said satellite receiver device.

2. The earth station transmitter device as in claim 1, comprising a controller arranged to convey said second modulation and coding decodable by said satellite receiver device based on information related to link quality received from said satellite receiver device.

3. The earth station transmitter device as in claim 1, wherein said further encapsulation means is arranged to provide feedback to said shaping encapsulation means in case the uplink throughput capacity is exceeded by said downlink data traffic.

4. The earth station transmitter device as in claim 1, wherein in said shaping encapsulation means information on said encapsulating can be fed back in order to adapt said estimate of said total bit rate available for said downlink data traffic.

5. The earth station transmitter device as in claim 1, comprising downlink encoding means to encode said downlink baseband frames and
wherein said further encapsulation means is arranged to process said encoded downlink baseband frames.

6. A satellite communication system comprising an earth station transmitter device as in claim 1 and a satellite receiver device arranged for receiving said uplink transmission signal and comprising demodulation and decoding means for converting said uplink transmission signal into uplink baseband frames and decapsulation means for converting said uplink baseband frames into said downlink baseband frames.

7. The satellite communication system as in claim 6, comprising a satellite downlink transmitter device and earth station receiver device, said satellite downlink transmitter device arranged to receive said downlink baseband frames from said satellite receiver device and comprising encoding and modulation means to convert said downlink baseband frames into a downlink transmission signal using said first modulation and coding decodable by said earth station receiver device.

8. The satellite communication system as in claim 7, wherein said satellite downlink transmitter device comprises a network clock reference restamper arranged to replace one or more bit values inside said downlink baseband frames by bit values representative of a timestamp value.

9. The satellite communication system as in claim 8, wherein said earth station receiver device is arranged to use a clock reference based on said timestamp value to organize transmission from said earth station receiver device over a return link.

10. The satellite communication system as in claim 7, wherein said satellite downlink transmitter device is arranged for inserting a network clock reference.

11. The satellite communication system as in claim 6, wherein said controller of said earth station transmitter device is arranged to receive said link quality information from said earth station receiver device and/or from said satellite receiver device.

12. The satellite communication system as in claim 6, wherein said satellite receiver device is comprised in a first satellite and said satellite downlink transmitter device is comprised in a second satellite different from said first satellite.

13. The satellite communication system as in claim 12, wherein said second satellite is a beam hopping satellite.

14. The satellite communication system as in claim 12, wherein said second satellite comprises for return link communication a receiving satellite demodulator implemented as a multi-carrier burst demodulator,
wherein said first satellite is arranged to transmit a downlink signal to an earth station receiver device for return link communication and
wherein, for return link communication, said first satellite comprises encoding and modulation means for converting baseband frames demodulated in said second satellite into said downlink transmission signal to said earth station receiver device.

15. The satellite communication system as in claim 14, wherein said earth station receiver device comprises a return link controller arranged to receive signal parameters and to control the quality of said return link communication based on said received signal parameters.

16. The satellite communication system as in claim 15, wherein said return link controller is adapted to reduce the return link capacity if there are less dummy frames in said downlink transmission signal than a given threshold level.

* * * * *